INVENTOR.
Leander J. Peterson
BY
McCormick, Paulding & Huber
ATTORNEYS

United States Patent Office
3,556,734
Patented Jan. 19, 1971

3,556,734
EXHAUST GAS CONDITIONING APPARATUS
Leander J. Peterson, 100 Oakwood Ave.,
West Hartford, Conn. 06119
Filed Feb. 5, 1968, Ser. No. 703,020
Int. Cl. F01n 3/16
U.S. Cl. 23—277                                6 Claims

ABSTRACT OF THE DISCLOSURE

An exhaust gas purifying apparatus having a closed housing defining a chamber containing a filter and partially filled with a purifying liquid. Gas inlet and outlet conduits connected to the housing at opposite ends thereof provide a generally horizontal path of gas flow through the chamber and above the surface of the purifying liquid. A means is provided for continuously conducting purifying liquid upwardly in the chamber and discharging it above the liquid surface and toward the filter to wet the filter medium so that gases passing through the chamber are exposed to both the filter medium and the purifying liquid.

---

This invention relates in general to gas conditioning apparatus and deals more particularly with an improved gas purifying apparatus for attachment to an exhaust system of an internal combustion engine or the like.

The general aim of the present invention is to provide an improved apparatus of the generally aforedescribed type particularly adapted for treating the exhaust gases emanating from an internal combustion engine of a motor vehicle or the like to remove noxious components therefrom.

SUMMARY OF INVENTION

In accordance with the present invention an exhaust conditioning apparatus is provided wherein the gases of exhaust pass through a filter medium continuously wetted by a purifying liquid. The liquid recirculates within the apparatus in response to flow of gas therethrough. The particular arrangement of the components which comprise the apparatus render it particularly well suited for use on the exhaust system for an internal combustion engine of a motor vehicle or the like.

Figure 1:
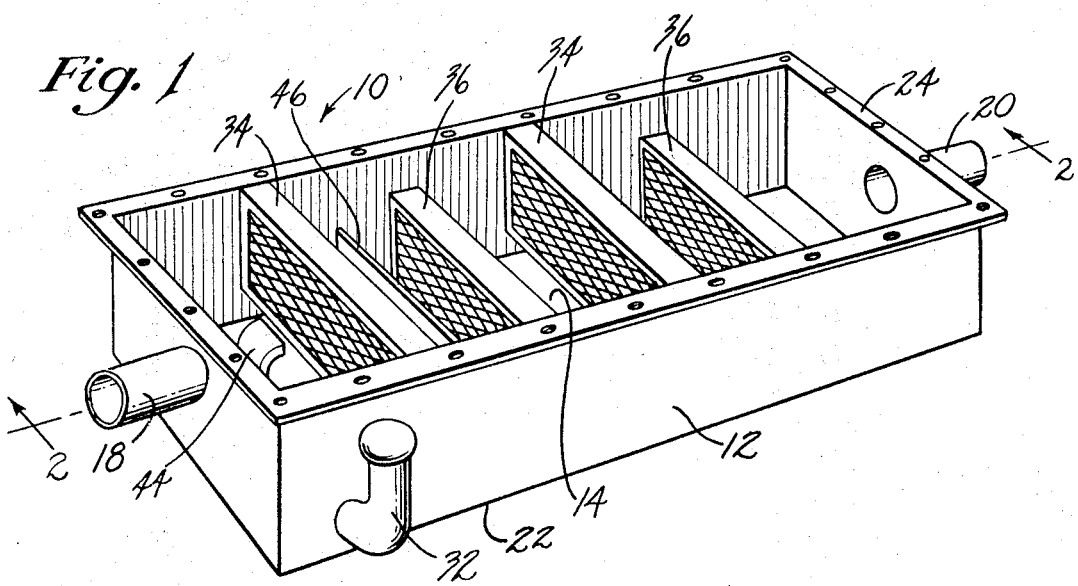
FIG. 1 is a somewhat schematic perspective view of a gas conditioning apparatus embodying the present invention, the housing cover being removed to reveal the internal structure of the apparatus.
Figure 2:
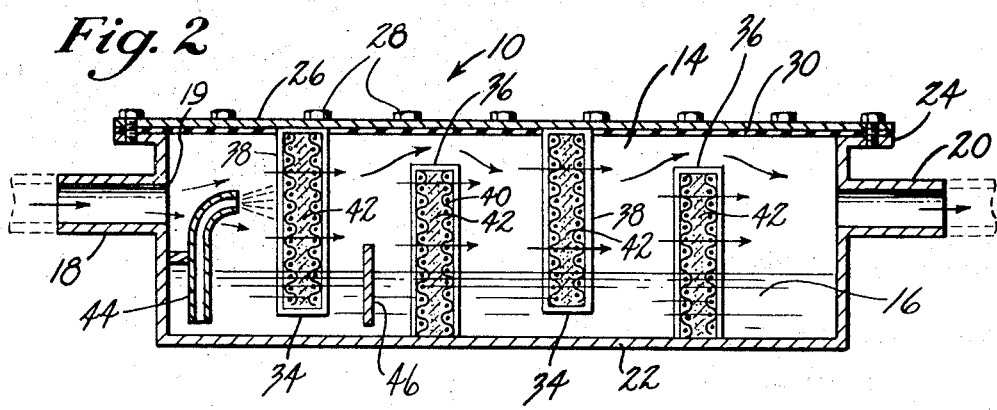
FIG. 2 is a longitudinal sectional view through the apparatus shown in FIG. 1 and taken along the line 2—2 of FIG. 1.

Referring now to the drawing and first to FIGS. 1 and 2 thereof, a gas conditioning apparatus embodying the present invention and indicated generally at 10 comprises a housing 12 having a chamber 14 the lower portion of which forms a reservoir or sump containing a quantity of purifying liquid 16, shown in FIG. 2. Exhaust gases are carried into the chamber 14 by an inlet conduit 18 connected to the forward end of the housing 12 and having an inlet opening 19. An outlet conduit 20 connected to the rear end of the housing carries conditioned gases from the chamber 14. The inlet and outlet conduits communicate with the chamber 14 above the surface of the purifying liquid 16 and cooperate to provide a generally horizontal path of gas flow into and through the chamber as generally indicated by the arrows in FIG. 2.

The shape of the housing and material from which it is made may vary, but preferably the housing 12 is fabricated from sheet metal and takes the form of a horizontally elongated generally rectangular tank 22. At its upper end the tank 22 has an outwardly turned lip or flange 24 providing a seating surface for a cover plate 26 secured to the flange by a plurality of bolts 28, 28. A gasket 30 mounted between the flange 24 and the cover plate 26 serves to seal the chamber 14 and prevent leakage of gas and/or purifying liquid therefrom.

It will be occasionally necessary to replenish the supply of purifying liquid in the chamber 12 and for this purpose a capped fill pipe 32 is provided, as shown in FIG. 1. The fill pipe is generally L-shaped, has a lower end connected to a sidewall of the tank 22 and communicates with the chamber 12 below the surface of the purifying liquid 16. The upper end of the fill pipe 32 is spaced some distance above the surface of the purifying liquid.

Various purifying liquids may be used in practicing the invention. However, the choice of an appropriate purifying liquid will be generally determined by the characteristics of the gases to be treated and the composition of the noxious components to be removed therefrom. Where the products of combustion of a petroleum fuel are to be treated a solvent of the chlorinated hydrocarbon type may, for example, be appropriate in some instances for use as a purifying liquid, an example of such a solvent being perchloro ethylene. However, when the apparatus is positioned in a system so that gases enter it at relatively high temperatures it may be desirable to use a somewhat less volatile purifying liquid.

Gases passing through the apparatus are constrained to flow through at least one filter disposed in the chamber 14 between the inlet and outlet conduits. The number and general arrangement of filters within the housing may vary. In the embodiment 10 a longitudinally spaced series of substantially identical interspersed upper and lower filters are provided and indicated respectively at 34, 34 and 36, 36. Preferably each filter has a generally rectangular frame 38 and perforate end walls 40, 40 made from expanded metal, wire screen or like material forming a container for a filter medium 42. The nature of the filter medium will also be determined by the characteristics of the gas to be conditioned and the nature of the noxious components to be removed therefrom. The filter medium 42 may, for example, comprise a random fibrous material such as steelwool, however, a suitable chemical compound may also be employed to serve as both a mechanical filter and a reacting agent with respect to the gases passing therethrough. In the presently preferred apparatus granulated charcoal is used as a filter medium.

All of the filters are generally vertically disposed, extend transversely of the chamber 14 and are positioned at least partially above the surface of the purifying liquid 16. The upper filters 34, 34 are positioned adjacent the cover plate 26 and extend downwardly therefrom and for some distance below the surface of the purifying liquid 16. The lower filters 46, 46 reside generally adjacent the bottom of the tank 22 and extend upwardly therefrom but have the upper ends thereof spaced downwardly from the cover plate 26. It will now be evident that filters arranged in the aforedescribed manner will function at least to some degree as baffles to cause at least some of the gases to flow along a generally serpentine path through the chamber 14 thereby imparting noise attenuating characteristics to the device. Thus, the apparatus may also serve to muffle the sound from an internal combustion engine or other gas generating mechanism with which it is used.

The gases which pass through the apparatus are exposed to the surface of the purifying liquid and to any vapors therefrom which may accumulate in the chamber 14.

However, to assure most efficient exposure of the gas to the purifying liquid a means is provided to saturate at least one of the filters and continuously maintain it in a saturated condition all times when gases are passing through the apparatus. For the aforedescribed purpose the apparatus 10 includes a single tube 44 for conducting purifying liquid generally upwardly in the chamber and discharging it above the surface of the liquid 16 and generally toward an associated filter 34. However, it should be understood that additional tubes may be provided, each tube preferably being associated with another of the filters. Preferably, and as shown, the tube 44 is generally L-shaped and is positioned near the forward end of the chamber 14 proximate the inlet conduit 18. The tube 44 has one end located below the surface of the purifying liquid 16 and the other end thereof positioned in close proximity to the inlet opening 19 and disposed in the path of gas flow from the inlet 18 to the outlet 12 and opening rearwardly or toward its associated filter 34 and is spaced some distance forwardly of the filter. The flow of gas past the tube 44 causes a reduced pressure at the upper end thereof which results in a continuous flow of purifying liquid up the tube and into the gas flow stream. The upper end of the tube serves as a nozzle to diffuse the stream of purifying liquid and discharge it against the forward end of the filter 34. The excess liquid on the filter runs off and returns to the sump so that continuous recirculation of purifying liquid occurs within the chamber as gases continue to flow therethrough. The aforedescribed filter saturating action also tends to produce a mist of purifying liquid in the chamber 14 while the apparatus is in operation. The baffling effect of the filters and the resulting serpentine flow of gas previously described assures maximum exposure of the gas to the purifying mist with further beneficial effect.

When the apparatus is used on the exhaust system of a motor vehicle or the like, it is desirable that provision be made to minimize the tendency of the purifying liquid to surge forwardly and rearwardly within the chamber 14 as the vehicle accelerates and decelerates. It will be obvious that the general arrangement of the filters within the apparatus will provide some baffling effect upon the purifying liquid to control the aforesaid surging tendency. However, preferably, one or more baffle plates are provided and interspersed between the filters for this purpose. A typical baffle plate indicated at 46 extends transversely of the chamber in spaced relation to the bottom of the tank 22 and is disposed partially above and below the surface of the purifying liquid 16.

Figure 3:
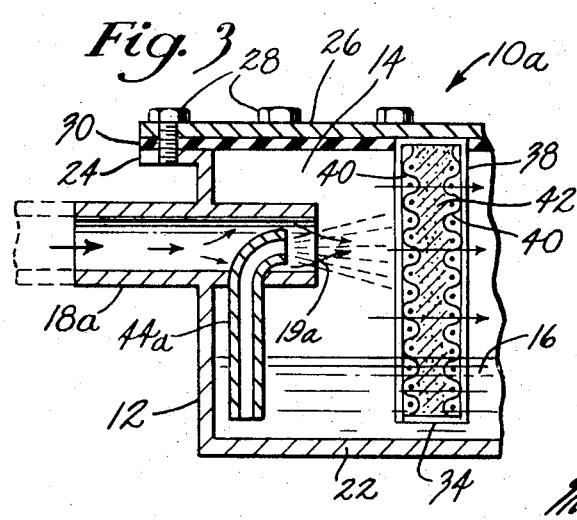
FIG. 3 is a somewhat enlarged longitudinal sectional view similar to FIG. 2 but shows another embodiment of the invention.

Another embodiment of the invention illustrated in FIG. 3 and generally designated by the reference numeral 10a is similar in many respects to the apparatus 10. Parts substantially identical to parts of the apparatus 10 bear the same reference numerals as parts previously described and will not be hereinafter further described. Like the apparatus 10 the apparatus 10a comprises a housing defining a chamber containing a plurality of filters and partially filled with purifying liquid.

Specifically, the apparatus 10a differs from the apparatus 10 in the following respects. The apparatus 10a has an inlet conduit 18a connected to the forward end of the housing 12 and extending for some distance into the chamber 14. The inner end of the conduit 18a opens rearwardly toward an associated filter 34 at the forward end of the chamber and is intersected by a vertically extending tube 44a. Preferably the tube 44a is generally L-shaped, has its lower end positioned below the surface of the purifying liquid 16 and its upper end extending axially rearwardly for some distance within the conduit 18a and terminating in close proximity to the conduit inlet opening 19a. Purifying liquid is drawn upwardly through the tube 44a in the manner previously discussed and discharged into the gas flow stream within the conduit 18a and generally toward the filter 34. The aforedescribed arrangement provides a most efficient means for saturating the forwardmost filter 34.

The drawing shows preferred embodiments of the invention and such embodiments have been described, but it will be understood that various changes may be made from the construction disclosed and that the drawing and description are not to be construed as defining or limiting the scope of the invention.

What is claimed is:
1. An exhaust gas conditioning apparatus comprising a closed housing defining a chamber for containing a quantity of purifying liquid, a gas inlet conduit connected to one end of said housing and having an inlet opening communicating with said chamber above the surface of the liquid, a gas outlet conduit connected to the opposite end of said housing and communicating with said chamber above the surface of the liquid, said inlet conduit and said outlet conduit cooperating with said chamber to provide a generally horizontal path of gas flow therethrough from said inlet conduit to said outlet conduit, at least two generally vertically disposed perforate containers extending transversely of said chamber between said inlet conduit and said outlet conduit and through which gas is generally constrained to flow in passing through said chamber, one of said perforate containers being positioned near said inlet opening, each of said perforate containers being at least partially disposed above and below the surface of the liquid and holding a quantity of filter medium, a tube disposed in said chamber between said inlet conduit and said one perforate container and having one end disposed below the surface of said liquid and the other end thereof positioned close to said inlet opening and in the path gas flow therefrom and into said chamber so that gas flowing into said chamber from said inlet conduit causes liquid to be conducted upwardly through said tube and to be discharged through said other end and generally toward said one perforate container, and a baffle plate extending transversely of said chamber between two of said perforate containers and partially disposed below the surface of the liquid whereby flow of gas into and through said chamber causes purifying liquid to flow up said tube and to be discharged therefrom onto said one perforate container to wet said filter media contained therein.

2. An exhaust gas conditioning apparatus as set forth in claim 1 wherein said chamber contains a quantity of chlorinated hydrocarbon comprising said purifying liquid.

3. An exhaust gas conditioning apparatus as set forth in claim 2 wherein said chlorinated hydrocarbon is perchloroethylene.

4. An exhaust gas conditioning apparatus as set forth in claim 1 wherein said filter medium is granulated charcoal.

5. An exhaust gas conditioning apparatus as set forth in claim 1 wherein said tube has an inverted generally L-shape and said other end thereof is directed generally toward said container.

6. An exhaust gas conditioning apparatus as set forth in claim 1 wherein said inlet conduit extends for some distance into said chamber said tube intersects said inlet conduit, and said other end is disposed within said inlet conduit.

References Cited
UNITED STATES PATENTS
3,032,968 5/1962 Novak et al. _____ 60—30
3,161,461 12/1964 Deal, Jr. et al. _____ 23—3

FOREIGN PATENTS
1,010,415 11/1965 Great Britain ___ 261—V.S. Dig.

JAMES H. TAYMAN, JR., Primary Examiner

U.S. Cl. X.R.

23—2, 284; 60—30; 181—36; 261—94, 98, 116